United States Patent
Haertel

(10) Patent No.: US 11,628,506 B2
(45) Date of Patent: Apr. 18, 2023

(54) RING-SHAPED TOOL FOR PROCESSING A WORKPIECE

(71) Applicant: Meiko Haertel, Ennepetal (DE)

(72) Inventor: Meiko Haertel, Ennepetal (DE)

( * ) Notice: Subject to any disclaimer, the term of this patent is extended or adjusted under 35 U.S.C. 154(b) by 160 days.

(21) Appl. No.: 16/815,462

(22) Filed: Mar. 11, 2020

(65) Prior Publication Data

US 2020/0306842 A1 Oct. 1, 2020

(30) Foreign Application Priority Data

Mar. 14, 2019 (EP) .................................... 19162792

(51) Int. Cl.
| | |
|---|---|
| *B23C 5/08* | (2006.01) |
| *B23C 3/28* | (2006.01) |
| *B23C 5/12* | (2006.01) |
| *B23C 3/30* | (2006.01) |
| *B23C 5/14* | (2006.01) |

(52) U.S. Cl.
CPC .................. *B23C 5/08* (2013.01); *B23C 3/30* (2013.01); *B23C 5/14* (2013.01); *B23C 2210/084* (2013.01)

(58) Field of Classification Search
CPC ...... B23C 2210/0485; B23C 2210/084; B23C 3/30; B23C 5/08; B23C 5/14; B23C 2210/0435; B23C 2240/16; B23C 5/06; Y10T 407/1964
See application file for complete search history.

(56) References Cited

U.S. PATENT DOCUMENTS

| | | | | |
|---|---|---|---|---|
| 56,033 A | * | 7/1866 | Frost .......................... | B23C 5/08 407/56 |
| 274,860 A | * | 3/1883 | Vivarttas ................. | B23F 21/14 407/29 |
| 706,013 A | * | 8/1902 | Boyce ...................... | A61C 3/02 407/62 |
| 1,857,428 A | * | 5/1932 | Butters ..................... | B23C 5/14 407/62 |
| 1,898,732 A | * | 2/1933 | Krohne ..................... | B23C 5/14 407/31 |
| 2,188,631 A | * | 1/1940 | Kraus ................. | B23B 51/0453 408/206 |

(Continued)

FOREIGN PATENT DOCUMENTS

| | | | | |
|---|---|---|---|---|
| EP | 1063040 A1 | * | 12/2000 | .............. B23C 5/06 |
| FR | 425526 A | | 6/1911 | |

(Continued)

OTHER PUBLICATIONS

Extended European Search Report for European Application No. 19162792.6 dated Oct. 9, 2019.

*Primary Examiner* — Sara Addisu
(74) *Attorney, Agent, or Firm* — Harness, Dickey & Pierce, P.L.C.

(57) ABSTRACT

The invention relates to a ring-shaped tool for processing a workpiece, wherein the tool has a fastening region which is centred with its ring shape for fastening to a rotatable drive shaft, wherein the tool has cutting teeth and the teeth extend on both sides of the tool in each case from the head region of the tool in the direction of the fastening region, the teeth on one side having a right-hand twist and providing right-hand cutting, and the teeth on the other side having a right-hand twist and providing left-hand cutting.

11 Claims, 4 Drawing Sheets

(56) References Cited

U.S. PATENT DOCUMENTS

| | | | | |
|---|---|---|---|---|
| 2,658,260 | A | * | 11/1953 | Hage .................. B23C 5/08 407/61 |
| 2,788,568 | A | * | 4/1957 | Pinto .................. B23C 5/14 407/63 |
| 3,079,669 | A | | 3/1963 | Bryant |
| 3,283,663 | A | * | 11/1966 | Davis .................. B23C 3/28 D8/62 |
| 3,605,527 | A | * | 9/1971 | Gambale ............ A61B 17/1666 76/115 |
| 3,678,554 | A | * | 7/1972 | Ezhov .................. B23C 5/14 407/62 |
| 4,218,159 | A | * | 8/1980 | Langen ................ B23C 5/12 407/31 |
| 4,614,463 | A | * | 9/1986 | Hughes ................ B23C 5/22 407/62 |
| 4,669,923 | A | * | 6/1987 | McKinney ............ B23C 3/126 407/62 |
| 5,063,980 | A | * | 11/1991 | Schultz ................ B27B 33/20 83/837 |
| 7,137,421 | B2 | * | 11/2006 | Biller .................. B27L 11/007 144/241 |
| 8,950,301 | B2 | * | 2/2015 | Marx .................. B23F 21/128 407/20 |
| 2001/0002972 | A1 | * | 6/2001 | Satran ................ B23C 5/08 407/34 |
| 2005/0186036 | A1 | * | 8/2005 | Doerfel ................ B23C 3/32 407/31 |
| 2008/0118313 | A1 | * | 5/2008 | Jonsson ................ B23C 5/10 407/42 |
| 2012/0121344 | A1 | * | 5/2012 | Schuffenhauer ..... B23D 77/006 407/11 |
| 2012/0170985 | A1 | * | 7/2012 | Hill .................. B23C 5/10 451/48 |
| 2014/0010606 | A1 | * | 1/2014 | Sagstrom .............. B23C 5/08 407/120 |
| 2014/0119843 | A1 | * | 5/2014 | Cha .................. B23C 5/1081 407/53 |
| 2014/0377020 | A1 | * | 12/2014 | Kurokawa ............ B23C 5/20 407/51 |
| 2015/0132075 | A1 | * | 5/2015 | Sjoo .................. B23F 21/223 407/100 |

FOREIGN PATENT DOCUMENTS

| | | |
|---|---|---|
| JP | S6020815 A | 2/1985 |
| JP | 07009233 A1 * | 1/1995 |
| WO | WO-2014/072134 A1 | 5/2014 |

* cited by examiner

RING-SHAPED TOOL FOR PROCESSING A WORKPIECE

CROSS-REFERENCE TO RELATED APPLICATIONS

The present application claims priority under 35 U.S.C. § 119 to European Patent Application No. 19162792.6, filed on Mar. 14, 2019, in the European Patent Office, the entire contents of which are hereby incorporated by reference.

DESCRIPTION

The invention relates to a ring-shaped tool for processing a workpiece according to the preamble of claim 1 as well as to the use of such a tool, in particular for forming a flute as well as for processing an area in front of the flute.

Milling cutters, amongst other things, which, similarly to machine tools with an unstructured tool (for example abrasive cut-off machines, angle grinders), are designed to sink into the workpiece via a rotating milling ring perpendicularly to the rotation axis and to remove material from the workpiece in a direction not parallel to the surface of the workpiece (typically perpendicularly to the surface) are known in the prior art for the machining of workpieces. This machine type will be referred to hereinafter as a "deep milling cutter", and the accordingly structured cutting ring will be referred to as a "deep milling ring".

An example of a deep milling cutter is the weld root opener, which may be used to remove a weld seam by milling. The deep milling ring of a weld root opener, on its radial outer edge (also referred to herein as the head region), has cutting teeth (outer toothing) in order to remove material from the depth of the workpiece in a milling notch defined by the geometry of the deep milling ring. In order to enable a cleaner processing of the side walls of the milling notch, the teeth may be continued at the side faces of the deep milling ring.

Millers which, similarly to machine tools with an unstructured tool (for example disc sanders, random orbital sanders), are designed to be placed against the workpiece via a rotating milling ring parallel to the rotation axis and to remove material in planar fashion, parallel to the surface of the workpiece (perpendicularly to the rotation axis) are furthermore known from the prior art. This machine type will be referred to hereinafter by the term "surface millers", and the accordingly structured cutting ring will be referred to as a "surface milling ring". A surface milling ring, to this end, has cutting teeth on the side face (also referred to herein as the end region) (surface toothing), which teeth are brought into contact with the workpiece surface in order to process it. A surface miller may be used for example to prepare a weld seam edge or to mill off any protruding material of a weld seam.

The boundary between head region and end region is defined herein, for each tooth, as the point on the cutting edge where the tangential plane intersects the centre plane of the ring (which has a minimum sum of the inverse squares over all apexes) at an angle of 45 degrees.

Due to differences in the structure of the milling rings and the structure of the cutting teeth, use of a surface milling ring for non-surface-parallel processing of a workpiece in the manner of a deep milling ring or use of a deep milling ring for surface-parallel processing of a workpiece in the manner of a surface milling ring is not possible. Reasons for this may be, for example, the absence of a cutting effect in the desired milling direction or an unsuitable direction of removal of the chips.

Accordingly, the object of the invention is to create an improved ring-shaped tool for the processing of a workpiece and also a method for using such a tool. The objects forming the basis of the invention will be achieved by the features of the independent claims. Preferred embodiments of the invention are described in the dependent claims.

Explanations of technical effects of the described tool and use thereof, unless stated otherwise, relate always to a preferred use of the tool when installed in a miller with rotating drive element (for example electric motor or internal combustion engine, optionally with transmission). Installation of the tool in either a manual milling machine or a robot milling machine is possible equally.

Furthermore, the terms "left-hand cutting" and "right-hand cutting" relate to the situation of use that the tool installed in the manner described above is placed against the surface from above in the manner of a deep milling ring (i.e. with the rotation axis not perpendicular to a level surface of the workpiece or not perpendicular to a tangential plane running through the point of contact of the tool with the workpiece surface), the installed tool being frictionally connected to the drive element on only one of the two sides (the "drive side") during use. The terms "left-hand cutting" and "right-hand cutting" are defined in this use situation such that the installed tool performs its material-removing effect on the workpiece precisely when it rotates in an anti-clockwise direction or in a clockwise direction as viewed along the rotation axis from the drive side towards the tool, and therefore each tooth contacts the surface of the workpiece either from the left from above or from the right from above. If, by contrast, in the described situation of use and viewing direction, a tool with left-hand-cutting teeth is rotated in a clockwise direction or a tool with right-hand-cutting teeth is rotated in an anti-clockwise direction, there is substantially no material removal.

A tooth of the surface toothing of the ring-shaped tool has a twist if its direction of extent from the head region to the fastening region deviates from a purely radial course. Expressed in cylinder coordinates, a tooth without twist, starting from a point $(r_1, \varphi_1, z_1)$ in the head region with radius $r_1$ would extend in a straight line, i.e. with a constant polar angle $\varphi_1$, as far as a point $(r_2, \varphi_1, z_2)$ at a radius $r_2 < r_1$. The deviation of a tooth with twist from this course may run for example in a straight line (i.e. with a constant gradient in $\varphi$) or in a curved fashion (with a variable gradient in $\varphi$).

In one example, the cutting edge of each tooth is curved in the form of a segment of a circle that is non-concentric with the centre point of the ring. If a tooth with twist lies at a contact point on a workpiece situated beneath the tool (rotation axis parallel to the workpiece surface at the contact point) and if this tooth is viewed (on the side of the tool facing the viewer) from a direction parallel to the rotation axis, the twist is thus a left-hand twist if the direction of extent of the tooth, starting from the contact point, is inclined to the left in relation to the purely radial extent, and is a right-hand twist if the direction of extent of the tooth, starting from a contact point, is inclined to the right in relation to the purely radial extent.

In one aspect of the invention a ring-shaped tool for processing a workpiece is provided, wherein the tool has a fastening region which is centred with its ring shape for fastening to a rotatable drive shaft, the tool having cutting teeth and the teeth extending on both sides of the tool in each case from the head region of the tool in the direction of the fastening region, the teeth on one side having a right-hand twist and providing right-hand cutting, and the teeth on the other side having a right-hand twist and providing left-hand cutting. Due to these features, the tool according to the invention could have the advantage of allowing machining of a workpiece both as a deep milling ring and as a surface milling ring. The effect of a deep milling ring could be made possible by the outer toothing of the tool, whereas the effect of a surface milling ring could be made possible by the surface toothing of the tool.

In accordance with the invention the teeth in the region of the surface toothing are formed with a right-hand twist. The forming of the teeth with a twist could assist the radial material discharge of the removed material, such that the tool may continuously remove material unhindered. Practically no contaminations are therefore left behind in the milled region, which could simplify a subsequent processing, for example a welding or filling. The forming of the twist as a right-hand twist could make it possible to remove the chips in a direction running radially outwardly, in the case of use of the tool as a surface milling ring. The forming of the right-hand twist on both sides could allow the use of the tool as a surface milling ring with the described advantageous chip removal in both rotation directions. In addition, the right-hand twist on both sides could result in smoother running of the milling machine, in the case of use of the tool as a deep milling ring.

The combination of a left-hand-cutting tooth structure with right-hand twist on one side with a right-hand-cutting tooth structure with right-hand twist on the other side of the tool could additionally result in a specialisation of the advantageous dual use of the tool (both as deep milling ring and surface milling ring) when installed in a machine that (due to standardisation) is designed exclusively for a rotary drive of the ring in a clockwise direction (as viewed from the drive along the driveshaft in the direction of the installed tool). In order to achieve a tool having a specialisation of the aforementioned dual use for a drive working exclusively in an anti-clockwise direction (in the same viewing direction), the tool would have to be formed with a combination of a left-hand-cutting tooth structure with left-hand twist on one side with a right-hand-cutting tooth structure with left-hand twist on the other side of the tool.

When using the tool, a milling notch could be formed in a workpiece, for example using the outer toothing. In a further process step, a surface of the workpiece could be milled by the surface toothing using the same, installed tool. In a further example, the tool installed similarly could be used to mill a flute using the outer toothing and to smooth-mill an area in front of the flute using the surface toothing. The two process steps could thus be carried out without having to change the tool, i.e. in a single process step.

The tool according to the invention may be provided to open a weld seam. In one example the tool installed similarly could be used to finish a weld seam using the surface toothing and to mill the weld seam using the outer toothing. Due to the particular material hardness of weld seams and the precision of the tool guide necessary to open the weld seam, said tool could be particularly well suited for this work. In spite of the material hardness, the tool could remove the material uniformly on account of its cutting geometry and could still have a high running smoothness, such that even manual guidance could be possible. The tool could enable a simple and precise forming or cleaning, for example of a number of weld seam layers on very large (for example extremely heavy) components. The tool according to the invention could be used to prepare a surface by milling of a flute using the outer toothing and smooth-milling of an area in front of the flute using the surface toothing, and at the same time to prepare a connection edge of the workpiece for welding.

In a more specific example, the workpiece is a welded steel part made of a high-strength fine-grained steel, for example of yield strength class S690 or S960, which for example is used in crane construction or the manufacturing of presses. Any defects in the weld seam are discovered in a radiographic examination with X-rays. In the case of conventional work to remove the defect using a gouging torch, the S690 or S960 steel would be exposed to a high thermal load of typically 600-800° C., whereby the material would lose strength. This could lead to fatigue cracks or breakage. By contrast, a typical heat development when opening a weld seam in S690 or S960 steel using a deep milling ring is between 60 and 70° C.

In accordance with embodiments of the invention the working region of the tool is given by the head region and the sides which have the teeth. The working region of the tool is defined herein as the region in which the teeth may provide a material-removing effect in at least one rotation direction. Due to the extent of the working region to the sides which have the teeth, the area of contact between the tool and the workpiece could be maximised in the case of use as a surface milling ring. This could enable a higher feed rate of the surface miller. The aforesaid extent of the working region could also result in a smoother and more uniform milling of the inner walls of the milling notch in the event of use as a deep milling ring. This could be relevant in particular if the milling notch is to be later filled by a new weld seam.

In accordance with embodiments of the invention, the cutting edge of a tooth on one side and the cutting edge of a tooth on the other side transition into one another at an angle of 170-180 degrees in the head region at a point of intersection, measured in a tangential plane of the ring shape passing through the point of intersection. The cutting edges transitioning into one another thus form a continuous edge, whereby a smoother and more uniform milling of the apex of the milling notch could be achieved in the event of use as a dep milling ring. The transition angle of 170-180 degrees could result in a maximisation of the cutting force and thus of the energy efficiency.

In accordance with embodiments of the invention, the teeth, as viewed in the axial ring direction, have an arch shape with an apex in the head region, wherein the arch shape is provided on one of the sides by two circles that transition tangentially into one another contourlessly, with a first circle radius and a second circle radius, the circle centre for the first circle radius lying beneath the apex, and the circle centre for the second circle radius lying beneath the circle centre for the first circle radius as viewed in the radial direction, the first circle radius being smaller than the second circle radius. As a result of these features, the tool according to the invention could have the advantage that a highly effective cutting geometry may be provided, which makes it possible to operate the tool manually particularly effectively. Due to the arch shape, the tool initially contacts the workpiece only with a minimal contact area, whereby the forces exerted from the workpiece onto the tool are kept small. The use of the above-mentioned arch shape could thus make it possible to provide an optimal compromise between material removal, manageability, and lateral material discharge. In addition, due to the arch shape of the tool, a milling notch shaped with the same arch shape could be worked into the workpiece, which may then be easily welded again.

In accordance with embodiments of the invention as viewed in the radial direction of the tool, the distance between the circle centres of the first circle radius and the second circle radius is between 0.5 and 0.7 times the difference between the first circle radius and the second circle radius. Particularly smooth operation could thus be possible on account of the slight curvature of the teeth.

In accordance with embodiments of the invention, the ratio of the second circle radius to the first circle radius is between 10 and 20. In accordance with embodiments of the invention the ratio of the second circle radius to the first circle radius is between 14 and 17. Due to the specific choice of this ratio of the radiuses, a particularly high running smoothness could be made possible during the material removal. Once the tool has infiltrated the workpiece, an optimal compromise could be made between the material removal at the head side and the end region of the tool. Amongst other things, this could mean that the heat development at the tool created by the material removal is distributed uniformly. This could increase the longevity of the tool.

In accordance with embodiments of the invention the twist is constant over the sides of the tool. The efficiency of the material discharge could thus be kept constant, regardless of the depth of penetration of the tool into the workpiece that is to be machined. The cutting speed of the tool could thus be practically constant, regardless of the depth of penetration.

In accordance with embodiments of the invention, the cutting depth of the teeth starting from the head region in the direction of the fastening region decreases continuously for each of the sides. The cutting depth of a tooth is defined herein as the axial distance (in the direction of the rotation axis) between the cutting edge (the outer edge) of the tooth and the deepest point of the groove between the tooth and a tooth adjacent to this tooth. A cutting depth decreasing continuously from the head region to the fastening region thus corresponds to a tooth gap volume, which in the vicinity of the head region is greater than in the vicinity of the fastening region. This could have the advantage of ensuring an improved discharge of chips. Milled chips collect in the grooves between two adjacent teeth. Chips removed in the vicinity of the fastening region have the longest discharge path, and chips removed in the vicinity of the head region have the shortest discharge path. Since the milling effect may be assumed to be independent of the radial position, the material amount collected in the grooves increases from the inside out (from the fastening region to the head region). The radially outwardly increasing tooth gap volume takes this fact into account. In this way, a blockage of tooth gaps and/or a lifting of the tool from the workpiece as a result of an overfilling of the tooth gaps could be prevented.

In accordance with embodiments of the invention, the cutting depth of the parts of the tooth adjacent to the fastening region is 4-6 times smaller than the cutting depth of the parts of the teeth in the head region. A relative depth or volume difference in this region could be an optimal adjustment to a typical amount of chip volume, which effectively prevents an overfilling of the tooth gaps without compromising the mechanical stability of the teeth as a result of an excessive depth of the gaps.

In a further aspect, the invention relates to the use of a tool in accordance with one of the preceding claims for use in hand tools or in cutting machines, wherein, during use, the tool is applied optionally on the head side or by one of the sides to a workpiece that is to be processed.

Preferred embodiments of the invention will be explained in greater detail hereinafter with reference to the drawings, in which.

Hereinafter, similar elements are denoted by like reference signs.

Figure 1:
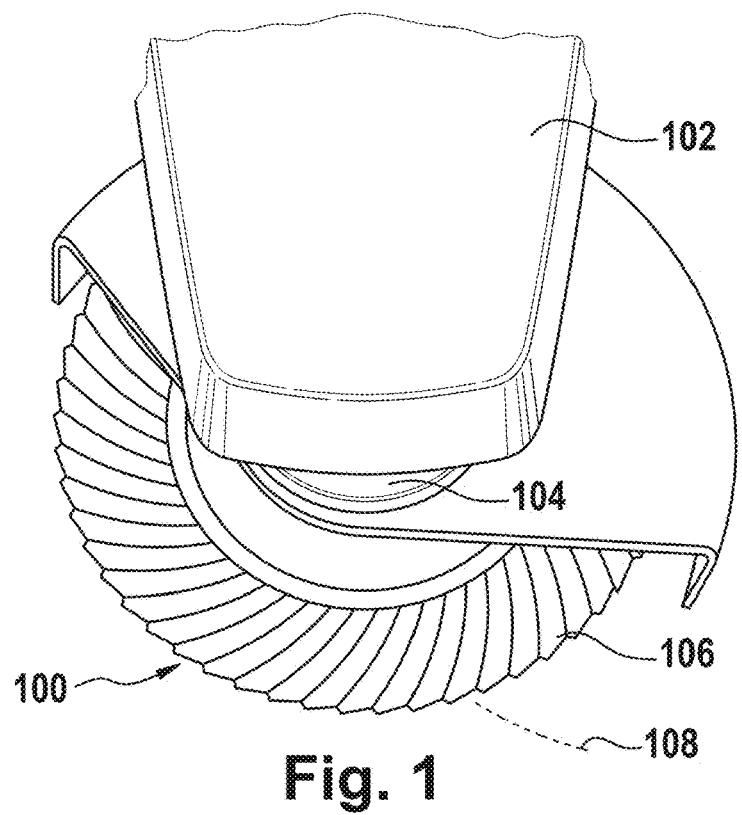
FIG. 1 shows a perspective view of a first side of a tool with drive means.

FIG. 1 shows a perspective view of a tool 100, installed in a machine having a drive means 102, for example a manually operable angle grinder. The drive means 102 drives the tool 100 in rotation via a shaft 104. The tool may remove material from a workpiece via teeth 106 of the tool. The tool 100 has a ring shape, with the teeth 106 being arranged over the circumference of the tool.

In FIG. 1 it can be seen in the perspective side view of the tool 100 that the teeth 106 are formed with a curved right-hand twist starting from the head side of the tool. The curvature 108 extends from the head side over the end region. This is used to provide an efficient material discharge (chip discharge) during use of the tool. The smooth running of the tool thus increases. This could be further increased if the teeth are interrupted regularly or irregularly along the curvature 108. In one example, the curvature is designed such that the twist angle of a tooth in the head region relative to a radial extent is 30 degrees and decreases as far as the fastening region to 20 degrees, i.e. the curvature corresponds to a twist difference of −10 degrees.

In the shown perspective, the teeth are structured relative to one another such that they provide a right-hand-cutting tool, i.e. a milling effect is created as the ring rotates in a clockwise direction. The teeth have an angle of attack relative to the running direction of the tool that lies typically in the range of 65-85 degrees (corresponds to a rake angle between 5 and 25 degrees). In this range there is typically an optimal compromise between a maximisation of the cutting effect, mechanical stability of the teeth, manual handling of the tool, smoothness of running, and material removal efficiency. In one example, for the processing of aluminium, the rake angle of the teeth could be −20 degrees, the clearance angle +10 degrees, and the twist angle in the head region 30 degrees to the right. The material of the teeth is preferably tungsten carbide.

The rake angle of the tooth face (cutting face) may be adapted homogeneously (for example ground) in accordance with the depth of the teeth as a function of the radial position. An improved control of the chip formation could thus be achieved for example by a continuous transition from machining (large rake angle in the vicinity of the fastening region) to transportation away (small rake angle in the vicinity of the head region).

In one example, the teeth of the tool are formed with a transition of the tooth depth of 4.5 mm at the head region to 0.9 mm at the fastening region via a ring width of 27.5 mm. With this geometry, the risk of a clogging of the chip space could be prevented.

Figure 2:
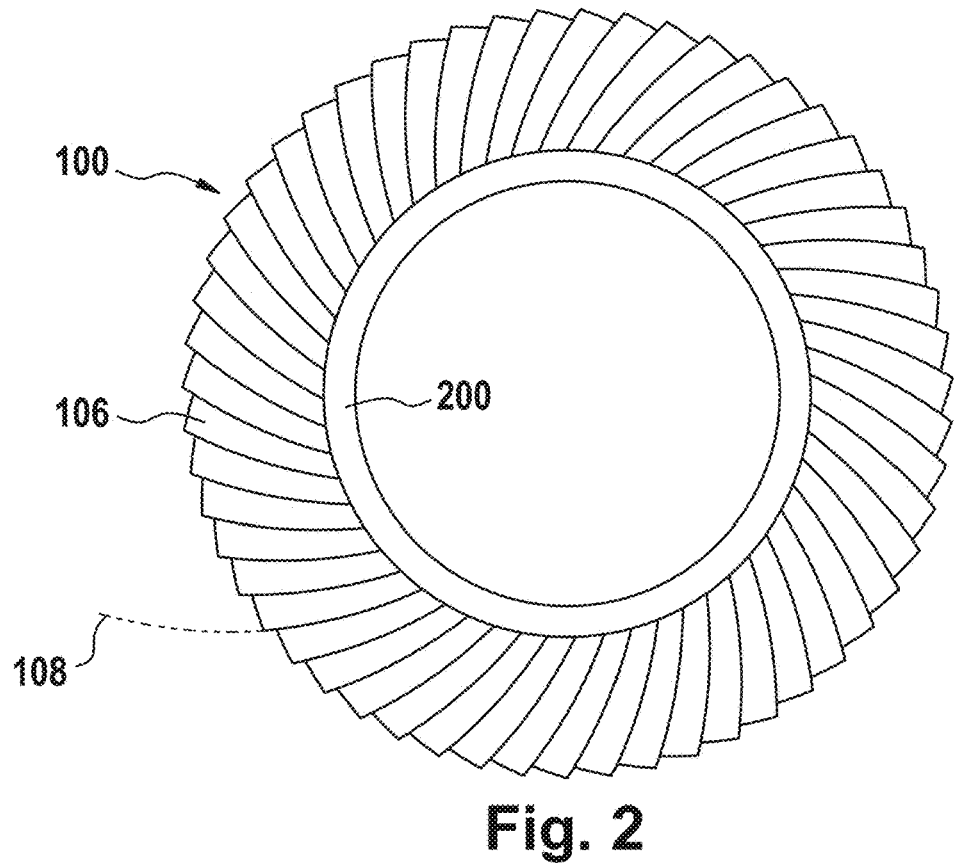
FIG. 2 shows a perspective view of a second side of a tool.

FIG. 2 shows a perspective side view of the tool from FIG. 1 from the second side, facing away from the viewer in FIG. 1. This second side provides left-hand cutting (mills when rotated in an anti-clockwise direction) and is also formed with a right-hand twist of the teeth. If the tool were installed as in FIG. 1, this would be the side of the tool facing away from the machine, by which material may be milled in planar fashion (surface milling). Due to the right-hand twist, chips produced during surface milling could be transported radially outwardly, which could prevent a clogging of the chip space of the milling machine.

In one example, the tool 100 has the following dimensions: outer diameter (measured between the radially outer end points of the cutting edges of two opposite teeth 106): 181 mm; outer diameter (measured between the radially outer end points of the bases of two opposite grooves): 178 mm; inner diameter (measured between the radially inner end points of the cutting edges of two opposite teeth 106): 123 mm; outer diameter of the fastening region 200: 120 mm; inner diameter of the fastening region 200 (diameter of the ring opening): 105 mm; thickness of the tool 100 (measured between the radially inner end points of the cutting edges of two opposite teeth 106): 20 mm; thickness of the fastening region 200: 6 mm; first circle radius: 2.5 mm; second circle radius: 52.5 mm.

In another example the tool 100 has the following dimensions: outer diameter (measured between the radially outer end points of the cutting edges of two opposite teeth 106): 231 mm; outer diameter (measured between the radially outer end points of the bases of two opposite grooves): 228 mm; inner diameter (measured between the radially inner end points of the cutting edges of two opposite teeth 106): 173 mm; outer diameter of the fastening region 200: 167 mm; inner diameter of the fastening region 200 (diameter of the ring opening): 152 mm; thickness of the tool 100 (measured between the radially inner end points of the cutting edges of two opposite teeth 106): 20 mm; thickness of the fastening region 200: 6 mm; first circle radius: 2.5 mm; second circle radius: 52.5 mm.

Figure 3:
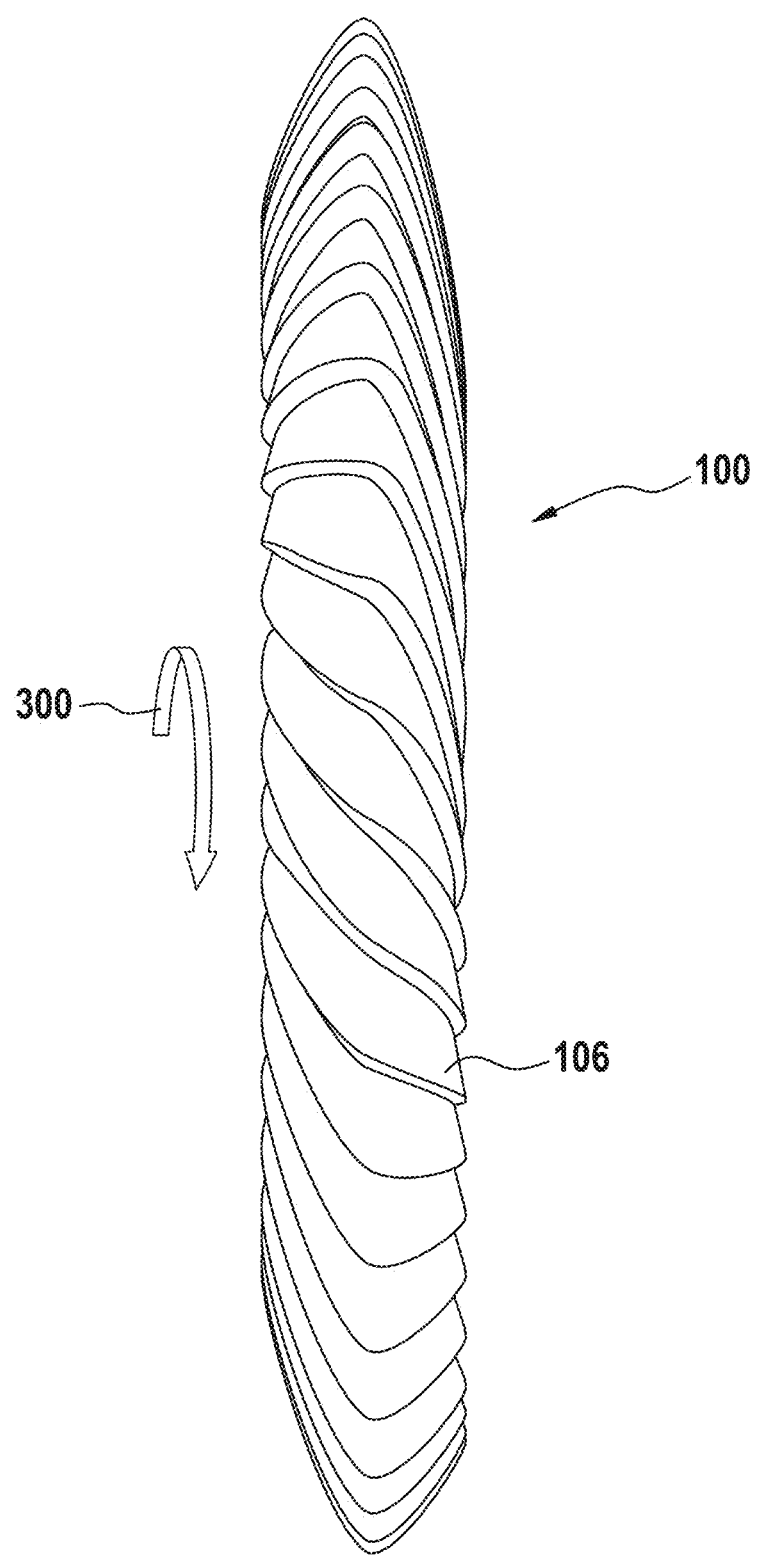
FIG. 3 shows a perspective view of a head region of a tool.

FIG. 3 shows a perspective view of a tool 100, in which the head region of the tool 100 faces the viewer. The teeth 106 of the tool 100 are formed on both sides with a right-hand twist and at the apex contact one another in pairs via their cutting edges at an angle of 170-180 degrees. In the shown orientation of the tool, the left-hand side provides right-hand cutting and the right-hand side provides left-hand cutting, i.e. the milling effect of the tool 100 is created upon rotation in the rotation direction 300, in which the head region, which is facing the viewer, runs downwardly. With installation of the tool 100 in a milling machine with drive running in a clockwise direction (as viewed from the drive to the tool), the left-hand side would face the drive. With use of the tool 100 installed in this way as a surface milling ring for processing a workpiece by the right end face of the tool 100, the chips created could advantageously be discharged radially outwardly on account of the right-hand twist.

Figure 4:
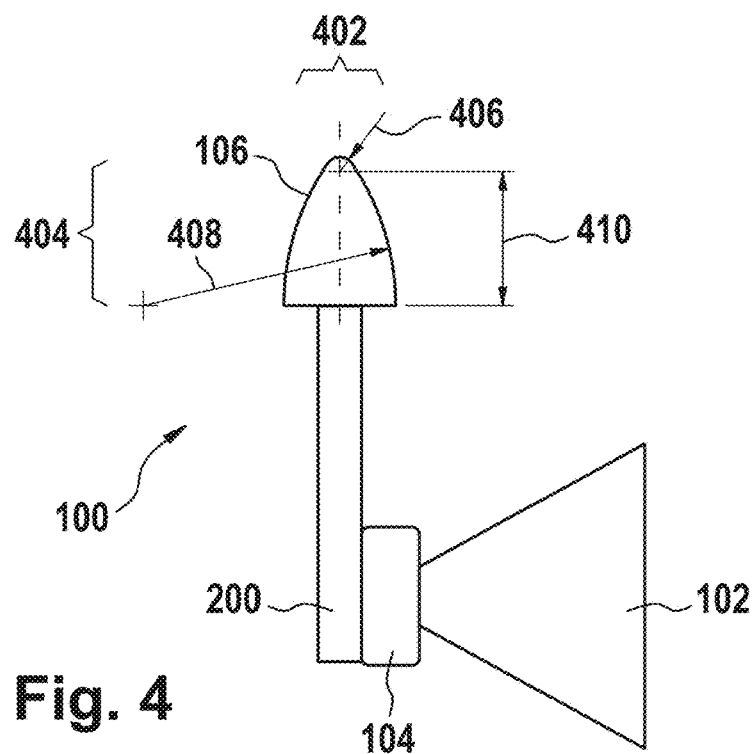
FIG. 4 shows a schematic cross-sectional view of a tool with drive means.

FIG. 4 shows a schematic cross-sectional view of the tool 100 of FIG. 1, wherein it can now be seen that the shaft 104 acts on a fastening region 200 of the tool 100. The section through an individual tooth 106 is also visible in FIG. 4 in the cross-sectional view, the tooth extending at least in part from the head side 402 via an end region 404 of the tool. In the axial direction (that is to say from left to right in FIG. 4), the tooth 106 has an arch shape with an apex and is formed mirror-symmetrically to the ring face of the tool passing through the apex. The teeth are thus formed on both sides of the tool, and the teeth on the left-hand side have a right-hand twist and provide left-hand cutting, whereas the teeth on the right-hand side have a right-hand twist and provide right-hand cutting.

The arch shape is describable in FIG. 4 by two circles, which transition tangentially into one another contourlessly. The arch shape describable by the two circles is definable by two circle radiuses, specifically a first radius 406 and a second radius 408. A particularly high smooth running of the tool when removing material could be provided by the ratio of the two radiuses of approximately a factor of 15.

As is also shown in FIG. 4, the tooth 106 extends only approximately as far as the circle centre of the second radius 404 in the end region 404. As viewed in the radial direction of the tool 100, the distance 410 between the circle centres of the first and second circle radius is approximately 0.6 times the difference between the first and second circle radius.

Figure 5A:
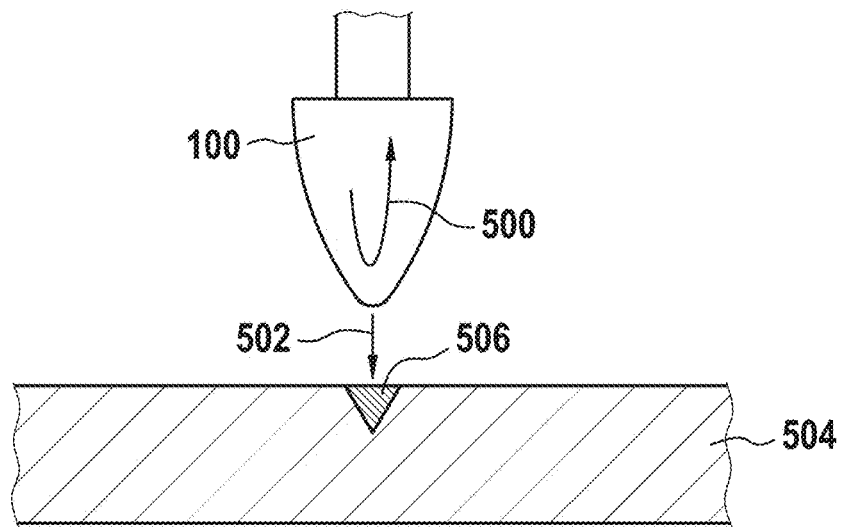
FIGS. 5a and 5b show schematic views of method steps for processing a workpiece.

FIG. 5a shows a workpiece 504 with a weld seam 506. In order to open the weld seam, i.e. the weld root, the tool 100 is now used, which is set in rotation in the direction 500 by a drive (not shown here). The tool 100 is placed in the weld seam 506 in a direction 502 and now removes material continuously.

Figure 5B:
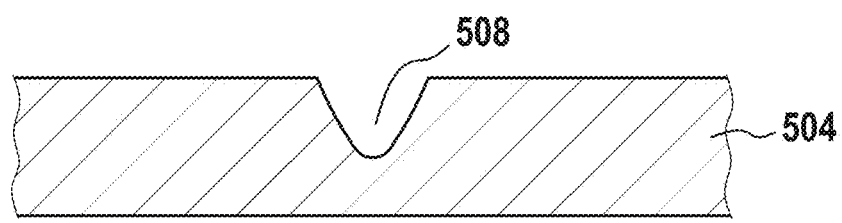

The result is shown in FIG. 5b, wherein the resultant milling notch 508 has the tooth shape of the tool 100. The milling notch 508 may now be welded again or filled otherwise with material.

Figure 6A:
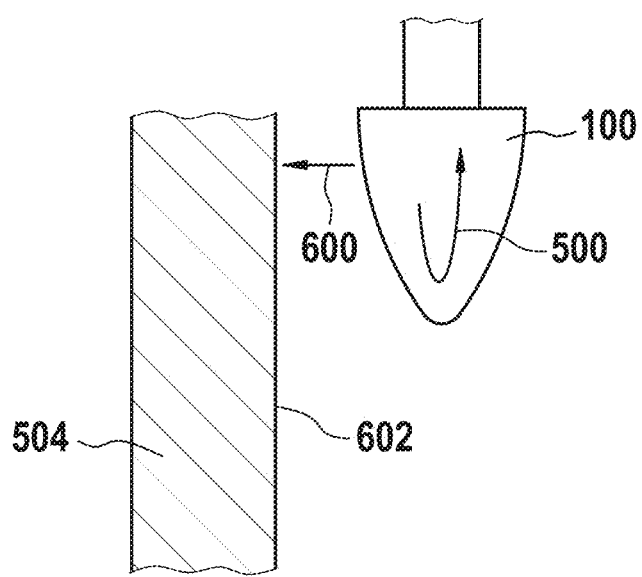
FIGS. 6a and 6b show schematic views of method steps for processing a workpiece.

FIG. 6a shows a workpiece 504 with a level vertical surface 602. The tool 100 is now used to mill the surface, for example in order to prepare a subsequent welding step. To this end, the tool is set in a rotational movement in the direction 500 by a drive (not shown here). The tool 100 is placed onto the surface 602 in the direction 600 and then removes material continuously.

Figure 6B:
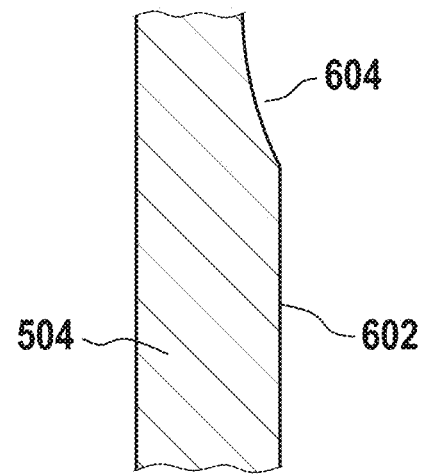

The result is shown in FIG. 6b, wherein the resultant milled surface 604 has the tooth shape of the tool 100. The milled surface 604 may now be welded, for example to a second workpiece (not shown), which has been milled similarly on an opposite surface by a milling face. As the two workpieces are joined together, the two opposite milling surfaces form a notch, which is then filled with material during the welding.

LIST OF REFERENCE SIGNS 100 tool
102 drive element
104 shaft
106 tooth
108 curvature
200 fastening region
300 direction
402 head region
404 end region
406 first radius
408 second radius
410 distance
500 rotation direction
502 direction
504 workpiece
506 weld root
508 milling notch
600 direction
602 surface
604 milled surface

The invention claimed is:
1. A ring-shaped tool for processing a workpiece, wherein the tool has a fastening region which is centered with its ring shape for fastening to a rotatable drive shaft, wherein the tool has cutting teeth and the teeth extend on both sides of the tool in each case from a head region of the tool in a direction of the fastening region, the teeth on one side, as viewed along a rotation axis on the one side, having a right-hand twist and providing right-hand cutting, and the teeth on the other side, as viewed along the rotation axis on the other side, having a right-hand twist and providing left-hand cutting.

2. The tool according to claim 1, wherein a working region of the tool is given by the head region and the sides having the teeth.

3. The tool according to claim 1, wherein a cutting edge of a tooth on one side and the cutting edge of a tooth on the other side transition into one another at an angle of 170-180 degrees in the head region at a point of intersection, measured in a tangential plane of the ring shape passing through the point of intersection.

4. The tool according to claim 1, wherein the teeth in an axial direction of the tool have an arch shape with an apex in the head region, wherein the arch shape is provided on one of the sides by two circles that transition tangentially into one another smoothly with a first circle radius and a second circle radius, a circle center for the first circle radius lying beneath the apex, and the circle center for the second circle radius lying beneath the circle center for the first circle radius as viewed in a radial direction, the first circle radius being smaller than the second circle radius.

5. The tool according to claim 4, wherein, as viewed in the radial direction of the tool, a distance between the circle centers of the first circle radius and the second circle radius is between 0.5 and 0.7 times a difference between the first circle radius and the second circle radius.

6. The tool according to claim 4, wherein a ratio of the second circle radius to the first circle radius is between 10 and 20.

7. The tool according to claim 6, wherein the ratio of the second circle radius to the first circle radius is between 14 and 17.

8. The tool according to claim 1, wherein the twist is constant over the sides of the tool.

9. The tool according to claim 1, wherein for each of the sides a cutting depth of the teeth decreases continuously starting from the head region in the direction of the fastening region.

10. The tool according to claim 9, wherein the cutting depth of parts of the teeth adjacent to the fastening region is 4-6 times smaller than the cutting depth of the parts of the teeth in the head region.

11. Use of a tool according to claim 1 for use in hand tools or in cutting machines, wherein, during use, the tool is applied optionally on a head side or by one of the sides to a workpiece that is to be processed.

\* \* \* \* \*